United States Patent

[11] 3,578,989

[72] Inventor Robert Charles Heuner
Bound Brook, N.J.
[21] Appl. No. 834,019
[22] Filed June 17, 1969
[45] Patented May 18, 1971
[73] Assignee RCA Corporation

[54] PULSE WIDTH STABILIZED MONOSTABLE MULTIVIBRATOR
7 Claims, 4 Drawing Figs.

[52] U.S. Cl. .......... 307/273, 307/265, 307/279
[51] Int. Cl. .......... H03k 3/26
[50] Field of Search .......... 307/273, 279, 265; 328/207

[56] References Cited

UNITED STATES PATENTS

| | | | |
|---|---|---|---|
| 3,005,963 | 10/1961 | Emile, Jr. | 307/273X |
| 3,173,028 | 3/1965 | Philips et al. | 307/279 |
| 3,217,179 | 11/1965 | Okuda et al. | 307/273X |
| 3,292,008 | 12/1966 | Rapp | 307/273X |
| 3,443,118 | 5/1969 | Rogers | 307/273X |

*Primary Examiner*—Stanley T. Krawczewicz
*Attorney*—H. Christoffersen

ABSTRACT: A monostable multivibrator comprising two cross-coupled inverters having substantially identical threshold voltage levels. Each cross-coupled path includes a charge storage means and there is also included a discharge path for each charge storage means. In response to complementary input signals to the inverters, the multivibrator switches from a first state to a second state and, in response to the first of either charge storage means discharging to the threshold voltage level, the multivibrator switches back to its first state.

INVENTOR
ROBERT CHARLES HEUNER
BY H. Christoffersen
ATTORNEY

Patented May 18, 1971 3,578,989

2 Sheets-Sheet 2

INVENTOR
ROBERT CHARLES HEUNER

BY H. Christoffersen
ATTORNEY

PULSE WIDTH STABILIZED MONOSTABLE MULTIVIBRATOR

BACKGROUND OF THE INVENTION

There is a class of monostable multivibrators, fabricated from complementary symmetry metal oxide semiconductor (COS/MOS) circuits, which, because the manufacturing parameters are difficult to control, often produce output pulses of different duration, unit to unit. Within such a multivibrator, which may include a pair of inverters on a silicon chip, the voltage threshold levels for the respective inverters are very close, generally within a tenth of a volt. From unit to unit, however, there may be a variation in threshold voltage level of up to 2 volts or more and this is what causes the different units to produce pulses of different duration.

It is the object of this invention to provide a monostable multivibrator circuit of the general type discussed above but in which the pulse widths are substantially the same from unit to unit.

BRIEF SUMMARY OF THE INVENTION

First and second inverters each having an input terminal and an output terminal and each inverter having a threshold voltage level. First and second coupling means including charge storage means for cross-coupling the respective input and output terminals of the inverters. Means are provided for applying a voltage pulse which is of a magnitude greater than the threshold voltage level to the input terminal of the first inverter and for applying a second voltage pulse, which is the complement of the first pulse, to the input terminal of the second inverter, whereby the inverters switch from a first condition to a second condition and whereby the inverters switch back to the first condition when the charge on one or the other of the charge storage means reaches the threshold voltage level.

DETAILED DESCRIPTION

Figure 1:
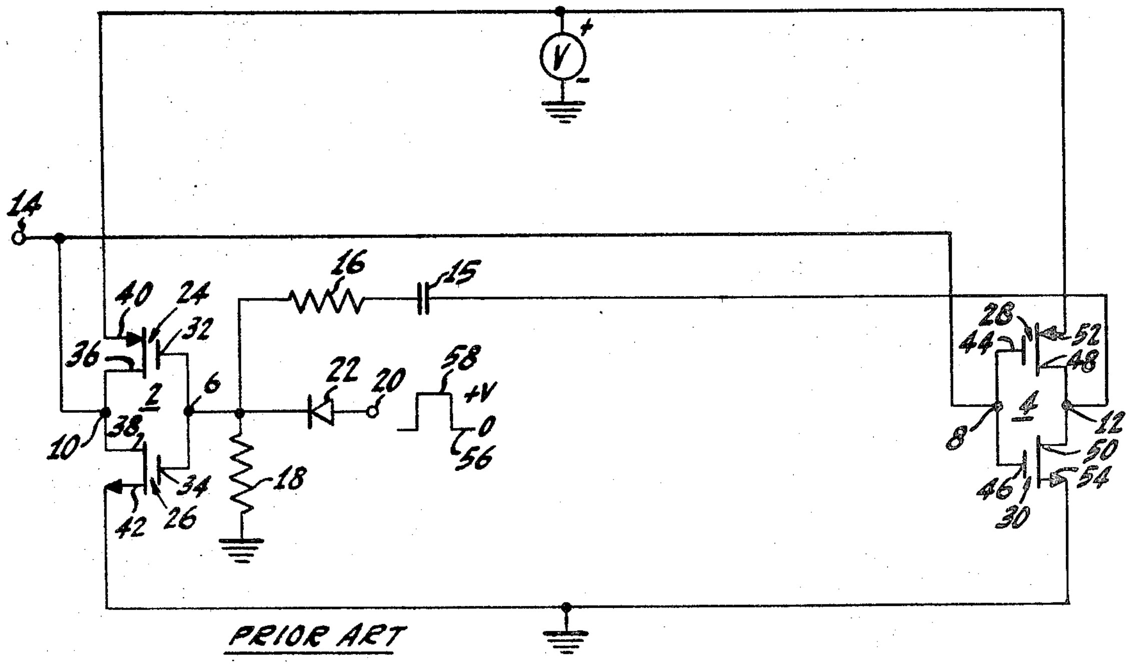
FIG. 1 is a schematic diagram of a known monostable multivibrator.

The active devices which are preferred for use in the practice of this invention are those of a class known as insulated-gate field-effect transistors (IGFET's). For this reason the circuits are illustrated in the drawings as employing such transistors and will be so described subsequently. However, this is not intended to preclude the use of other suitable devices and to this end, the term transistor, when used without limitation in the appended claims, is used in the generic sense.

For ease of illustration, IGFET's of the enhancement type are used to illustrate the monostable multivibrator circuit. However, any of the known types of field-effect transistors, e.g., depletion-type IGFET's or field-effect devices, may be used to practice the invention.

The particular monostable multivibrator to be described may be constructed from two inverters formed on a single silicon chip. Each inverter, for example, may comprise opposite conductivity transistors and are known in the art as complementary symmetry metal oxide semiconductors (COS/MOS).

FIG. 1 illustrates a monostable multivibrator which is known in the art. The multivibrator may comprise, for example, inverters 2 and 4, each having an input terminal, 6 and 8, respectively, and an output terminal, 10 and 12, respectively. These inverters may be formed on a single silicon chip as was described above. The output terminal 10 of inverter 2 is coupled to the input terminal 8 of inverter 4 and to an output terminal 14. The output terminal 12 of inverter 4 is coupled to the input terminal 6 of inverter 2 by way of a charge storage means which may be a capacitor 15 and a resistor 16. The input terminal 6 of inverter 2 is also connected to a source of reference potential, such as ground, by way of a resistor 18 and to an input terminal 20 by way of a diode 22.

The inverter 2 comprises opposite conductivity transistors 24 and 26, respectively, transistor 24 being of P-type conductivity and transistor 26 being of N-type conductivity. Inverter 4 is formed of opposite conductivity transistors 28 and 30, transistor 28 being of P-type conductivity and transistor 30 being of N-type conductivity.

The gate electrodes 32 and 34 of transistors 24 and 26, respectively are coupled together to form input terminal 6 of inverter 2. The drain electrodes 36 and 38 of transistors 24 and 26, respectively, are coupled together to form output terminal 10 of inverter 2. The source electrodes 40 and 42 of transistors 24 and 26, respectively, are connected to a source of operating potential +V and to a source of reference potential, such as ground, respectively.

The gate electrodes 44 and 46 of transistors 28 and 30, respectively, are coupled together to form input terminal 8 of the inverter 4. The drain electrodes 48 and 50 of transistors 28 and 30, respectively, are coupled together to form output terminal 12 of the inverter 4. The source electrodes 52 and 54 of transistors 28 and 30, respectively, are coupled to a source of operating potential +V and to a source of reference potential, such as ground, respectively.

Figure 2:
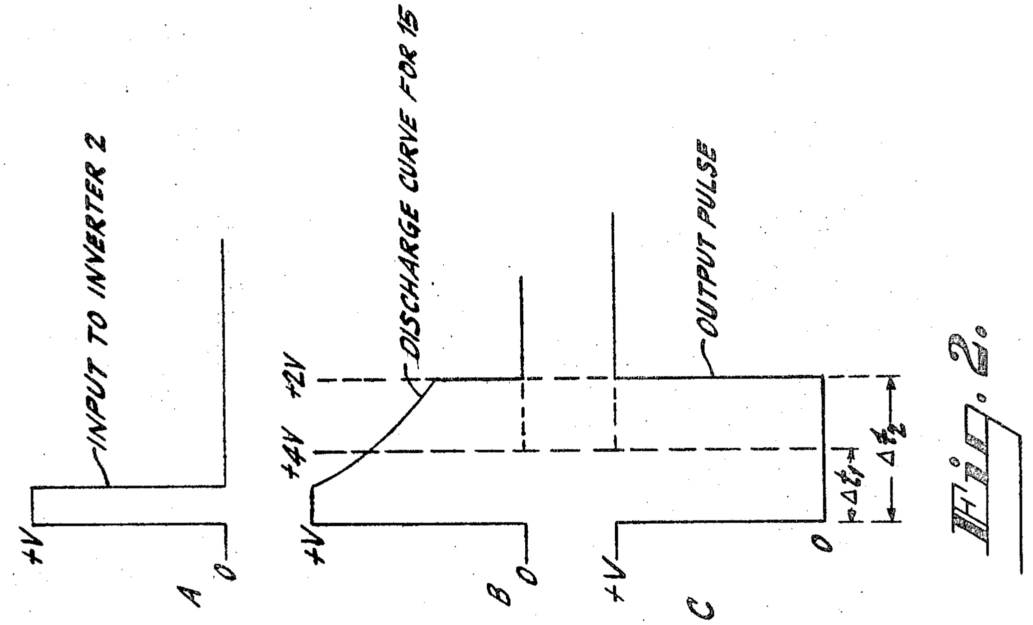
FIG. 2 illustrates a number of the waveforms produced in the circuit of FIG. 1.

Normally, a relatively low potential voltage, for example, 0 volts, such as shown at 56 in FIG. 1 and at A in FIG. 2, is applied to the input terminal 20. The diode 22, therefore, does not conduct as its anode and cathode are both at ground, and the input terminal 6 of inverter 2 is also at ground potential. Transistor 26, therefore, is cut off since its gate and source electrodes are at the same potential. Transistor 24, however, conducts current since its source electrode is at a higher potential than its gate electrode. The output terminal 10 of inverter 2 is at a relatively high voltage of approximately +V volts under these conditions. This relatively high voltage is coupled to the output terminal 14 and to the input terminal 8 of inverter 4. Transistor 28 is cut off since its gate and source electrodes are at substantially the same potential. Transistor 30, however, conducts since its gate electrode is at a higher potential than its source electrode. The output terminal 12 of inverter 4, therefore, is at a relatively low voltage, ground, under these conditions.

When the input signal at terminal 20 goes relatively high, for example, to +V volts, as is shown at 58 in FIG. 1 and at A in FIG. 2, diode 22 is forward biased and conducts. The potential +V volts, which is higher than the threshold voltage ($V_t$) of the inverters, is applied to the input terminal 6 of inverter 2, thereby cutting off transistor 24 and causing transistor 26 to conduct, whereby the voltage at output terminal 10 goes low, to 0 volts. This voltage is coupled to output terminal 14 and input terminal 8 of inverter 4, cutting off transistor 30 and causing transistor 28 to conduct, whereby the voltage at output terminal 12 goes high, to +V volts. Both plates of capacitor 15, therefore, are at the same voltage of +V volts.

When the input signal returns to 0 volts, capacitor 15 begins to discharge towards ground through resistors 16 and 18. This is illustrated at B in FIG. 2. When the voltage across the resistor 18 reaches the threshold voltage level $V_t$, the inverters return to their original states, and the output pulse C of FIG. 2 terminates. The threshold voltages $V_t$ of inverters 2 and 4 are approximately of the same value. However, from unit to unit, the threshold level may vary. For example, if the monostable multivibrator shown in FIG. 1 is connected to a source of potential +V of +6 volts, one pair of inverters may have a threshold voltage $V_t$ of +4 volts and another of +2 volts. In the first case, when the capacitor 15 has discharged to a level such that the voltage across resistor 18 is +4 volts, as shown at B in FIG. 2, the output pulse terminates and in the other case, the output pulse does not terminate until the capacitor discharges to a level such that the voltage across resistor 18 is +2 volts. In the first case, of course, the pulse duration $\Delta t_1$ is substantially shorter than in the second, $\Delta t_2$, and this, of course, is disadvantageous.

Figure 3:
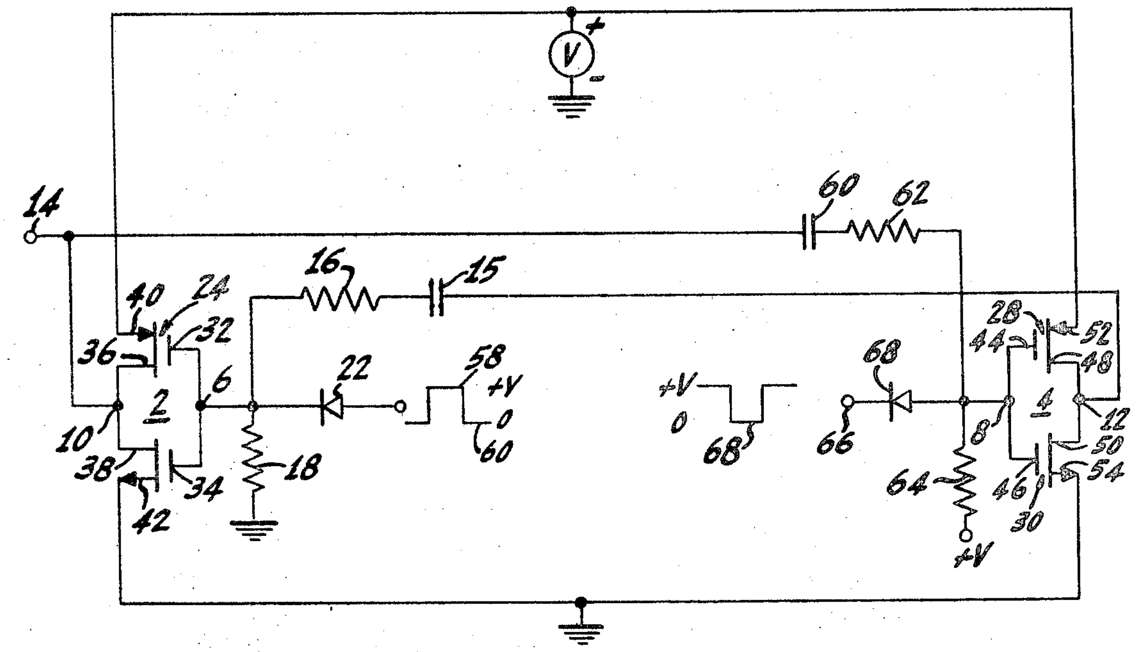
FIG. 3 is a schematic diagram of the preferred embodiment of the invention.
Figure 4:
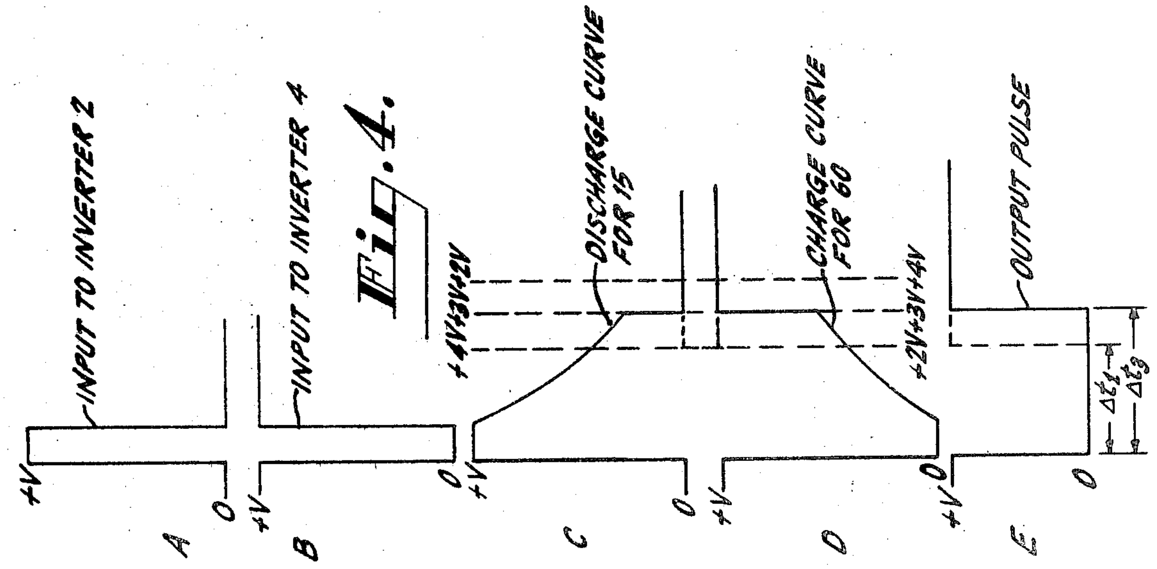
FIG. 4 illustrates a number of the waveforms produced in the circuit of FIG. 3.

FIG. 3 illustrates the improved monostable multivibrator circuit of the present invention in which the maximum pulse width variation from unit to unit is reduced by a factor greater than two. The circuit differs from the FIG. 1 circuit in a number of important respects. A charge storage means, such as a capacitor 60, and a resistor 62 are added to the second cross-coupling circuit (from terminal 8 to output terminal 14). The input terminal 8 is connected to a source of bias potential +V by way of a resistor 64 and to a second input terminal 66 by way of a diode 68. And, an input signal such as 68, as illustrated in FIG. 3 and at B in FIG. 4, which is the complement of the input signal applied to input terminal 20, is applied to the input terminal 66.

Initially, the monostable multivibrator illustrated at FIG. 3 is in the same condition as was described for the monostable multivibrator in FIG. 1, that is, with the input at terminal 20 low, 0 volts, the outputs at terminals 10 and 14 high, +V volts, and the input at terminal 8 high, due to the voltage +V volts applied via resistor 64. When the signal applied at input terminal 20 goes high, and the signal concurrently applied at input terminal 66 goes low, the state of the monostable multivibrator changes, that is, the voltage at output terminal 14 goes low. When the two input signals return to their initial states, that is, the input at terminal 20 low and the input at terminal 66 high, capacitor 15 begins to discharge from +V towards ground and capacitor 60 beings to charge from 0 volts towards +V, as is illustrated at C and D, respectively, in FIG. 4. If a particular monostable multivibrator circuit has a $V_t$ of +4 volts, for example, the first capacitor 15 or 60, respectively, to reach a voltage such that the voltage across resistor 18 or 64, respectively, is +4 volts causes the monostable multivibrator to switch to its stable state. Capacitor 15 discharges to this level in the time it takes capacitor 60 to charge to a level such that the voltage across resistor 64 is +2 volts, as is illustrated at C and D, respectively, in FIG. 4. The voltage across resistor 18, +4 volts, causes the multivibrator to switch to its original state, that is, output terminal 14 being at a high potential. The output pulse width, therefore, is $\Delta t_1$, as is illustrated at E, FIG. 4.

If a particular monostable multivibrator circuit were constructed in which the inverters had a $V_t$ of +2 volts, for example, the first capacitor 15 or 60, respectively, to reach a voltage such that the voltage across resistor 18 or 64, respectively, is +2 volts causes the monostable multivibrator to switch to its stable state. It may be seen that when the input signals to terminals 20 and 66 return to their original states, the capacitors 15 and 60 begin charging towards 0 volts and +V, respectively. It may be seen that capacitor 60 charges to +2 volts in the same time that capacitor 15 has discharged to +4 volts. The monostable multivibrator then switches, due to the voltage across resistor 64 being +2 volts, to its initial condition, that is, output terminal 14 at a high voltage level and the output pulse width is $\Delta t_1$, as is illustrated at E in FIG. 4. This illustrates that in two monostable multivibrator circuits in which in the first instance the inverters have a $V_t$ of +4 volts and in the second instance have a $V_t$ of +2 volts, the output pulse width is identical.

The widest pulse is obtained from a circuit according to the invention when its threshold voltage $V_t$ is midway between the maximum and minimum threshold voltages $V_{t(max)}$ and $V_{t(min)}$ for any particular batch of COS/MOS inverters. In the present example this occurs at $V_t$=+volts. This is illustrated at C and D in FIG. 4, where the pulse obtained has width of $\Delta t_3$. The narrowest pulses are obtained from the circuit at both extremes of threshold voltage variation $V_{t(max)}$ and $V_{t(min)}$. Since the slope of the discharge curve for capacitor 15 is steeper in the region from +4 to +3 volts than in the region from +3 to +2 volts, and the slope of the charge curve for capacitor 60 is steeper in the region from +2 to +3 volts than in the region from +3 to +4 volts, it may be seen that the pulse width variation from unit to unit has been reduced by a factor greater than two. In other words, the maximum pulse width variation $\Delta t_1 - \Delta t_3$ for the monostable multivibrator illustrated in FIG. 3 is less than half the maximum pulse width variation $\Delta t_1 - \Delta t_2$ illustrated for the monostable multivibrator in FIG. 1.

I claim:

1. In combination:

first and second charge storage means;

first and second inverters, each responsive to an input signal of one polarity and of greater than a given level for producing an output signal of opposite polarity and each responsive to an input signal of opposite polarity and lower than said given level for producing an output signal of said one polarity, said first inverter applying its output to the first charge storage means and said second inverter applying its output to the second charge storage means;

two discharge circuits, one coupled between the first charge storage means and the second inverter and the other coupled between the second charge storage means and the first inverter, each such discharge circuit supplying to the inverter to which it is connected a signal at a level greater than said given level when its charge storage means is sufficiently charged in one sense and at a level smaller than said given level when its charge storage means is sufficiently charged in the opposite sense; and means for applying a pulse of one polarity to said first inverter and of opposite polarity to the second inverter for causing said inverters to produce output pulses of opposite polarity.

2. In a monostable multivibrator, the combination comprising:

first and second inverters each having an input terminal and an output terminal and each said inverter having substantially identical threshold voltage levels;

first and second coupling means including charge storage means for cross-coupling the respective input and output terminals of said inverters; and means for applying a voltage pulse which is of a magnitude greater than said threshold voltage level to said input terminal of said first inverter and means for applying a second voltage pulse which is the complement of said voltage pulse to said input terminal of said second inverter whereby said inverters switch from a first condition to a second condition and whereby said inverters switch back to said first condition when the charge on one or the other of said charge storage means reaches said threshold voltage level.

3. In a monostable multivibrator having an input voltage threshold level such that in response to a voltage less than said threshold level said multivibrator remains in a first state and in response to a voltage greater than said threshold level switches to a second state, the combination comprising;

first and second inverters, each inverter having an input terminal and an output terminal;

first and second charge storage means;

means for connecting said first charge storage means between said input terminal of said first inverter and said output terminal of said second inverter and means for connecting said second charge storage means between said input terminal of said second inverter and said output terminal of said first inverter, said means for connecting including a charge path for said charge storage means;

a discharge path for each said charge storage means; and means for applying complementary signal levels to said input terminals such that said multivibrator switches from said first to said second state and in response to said switch said charge storage means are charged to said respective input signal levels such that as said charge storage means discharge, the first to reach said threshold level switches said multivibrator to said first state.

4. The combination claimed in claim 3, said inverters each including a pair of opposite conductivity transistors.

5. The combination claimed in claim 1, said charge storage means comprising capacitors.

6. The combination claimed in claim 3, said discharge path for each said charge storage means being connected to the respective input terminal of each said inverter.

7. In combination:

first and second charge storage means;

first and second inverters, each inverter having an input terminal and an output terminal, and each inverter comprising opposite conductivity transistors;

means for connecting said first charge storage means between the output terminal of said first inverter and the input terminal of said second inverter;

means for connecting said second charge storage means between the output terminal of said second inverter and the input terminal of said first inverter;

first and second resistors;

a two terminal source of operating potential;

means for connecting said first resistor between said input terminal of said first inverter and one terminal of said source of operating potential;

means for connecting said second resistor between said input terminal of said second inverter and the other terminal of said source of operating potential; and means for applying opposite polarity pulses to the respective input terminals of said inverters.